US006945361B1

(12) United States Patent
Hedgepeth

(10) Patent No.: US 6,945,361 B1
(45) Date of Patent: Sep. 20, 2005

(54) MOBILE TREE STAND

(76) Inventor: Virgil Eugene Hedgepeth, 704 Hillcrest Dr., Bradenton, FL (US) 34209

( * ) Notice: Subject to any disclaimer, the term of this patent is extended or adjusted under 35 U.S.C. 154(b) by 92 days.

(21) Appl. No.: 10/173,033

(22) Filed: Jun. 17, 2002

(51) Int. Cl.⁷ ............................................. A01M 31/00
(52) U.S. Cl. ..................................... 182/187; 182/142
(58) Field of Search ............................... 182/142, 187, 182/150

(56) References Cited

U.S. PATENT DOCUMENTS

| | | | |
|---|---|---|---|
| 797,722 A | * | 8/1905 | Crandall ..................... 182/142 |
| 2,689,890 A | * | 9/1954 | Green ..................... 200/61.13 |
| 2,851,085 A | | 9/1958 | Woodward |
| 3,528,657 A | * | 9/1970 | Krupsky ..................... 472/118 |
| 3,568,797 A | | 3/1971 | Hardy |
| 3,731,762 A | * | 5/1973 | Sirls ........................... 182/142 |
| 3,990,537 A | | 11/1976 | Swenson |
| 4,337,844 A | | 7/1982 | Hice |
| 4,552,248 A | * | 11/1985 | Payne ......................... 182/142 |
| 4,969,538 A | | 11/1990 | Amacker |
| 5,009,284 A | * | 4/1991 | Authement, Sr. ........... 182/142 |
| 5,143,177 A | | 9/1992 | Smith |
| 5,269,395 A | | 12/1993 | Lyzhoft |
| 5,316,104 A | | 5/1994 | Amacker |
| 5,685,103 A | * | 11/1997 | Wiggins ........................ 42/94 |

* cited by examiner

Primary Examiner—Alvin Chin-Shue
(74) Attorney, Agent, or Firm—Dorothy S. Morse

(57) ABSTRACT

A mobile tree stand that can be suspended in a desired position with a single rope, chain or the like, and thereafter safely, quietly and easily maneuvered into any position about the tree's circumference. Its user can shoot in any direction without standing and also use the tree as a gun rest for a shot in any direction. The mobile nature of the stand also provides a hunter with the option of using a gun support lanyard, which can be attached to the upper part of the stand or its supporting member. The stand can also be used for ground level hunting, as well as indoor and outdoor use by adults and children in recreational pursuits common to hanging chairs and swings. One embodiment includes a back support that reclines into various postures, including a completely supine position. In addition, it can be readily disassembled for easy transport and storage.

9 Claims, 4 Drawing Sheets

MOBILE TREE STAND

BACKGROUND

1. Field of the Invention

This invention relates to tree stands and handing chairs, more specifically to tree stands which are suspended to the desired position with a single rope, chain or the like. The present invention presents a mobile stand which may be readily maneuvered about the entire circumference of the tree to which it is attached.

2. Description of Related Art

Tree stands typically used by hunters, photographers and others are rigidly attached to the tree, pole or the like. This rigid attachment precludes freedom of movement by the user. Examples of rigidly mounted stands are presented in U.S. Pat. No. 4,337,844 to Hice (1982), U.S. Pat. No. 4,969,538 to Amacker (1990), and U.S. Pat. No. 5,143,177 to Smith (1992). While each of these stands presents a different style, all are obviously intended to remain rigidly attached while in use. U.S. Pat. No. 3,568,797 to Hardy (1971) presents a suspended seat arrangement wherein up and down mobility is accomplished with a hand-cranked pulley, however, this invention provides no other means of controlled mobility.

There has long been a need for a stand which will move freely with the user. Users of rigidly mounted tree stands are usually seated such that their backs are toward the tree. While so seated the hunter would have the opportunity for a comfortable confident shot within an arc of approximately 220 degrees, perhaps less for an archer. My mobile stand provides the user with the ability to safely, quietly and easily maneuver into any position about the entire circumference of the tree in which it is placed. In the typical prior art tree stand, the user would be forced to stand to gain position to shoot in any direction denied him while sitting. Standing can have undesirable consequences such as noise. In such a situation the hunter would likely be using a safety harness secured to the tree. Harnesses typically used in rigidly mounted tree stands can easily become impediments to effective gun and bow alignment. A further undesirable consequence presented by standing to gain shooting position is that of increased anxiety that one's balance might be lost. Safety harnesses that attach to the tree provide some assurance against falling to the ground. Such devices provide far less assurance against falling out of the tree stand. My mobile stand, through its extensive mobility, allows the user to shoot in any direction without standing and further, allows him to use the tree as a gun rest while doing so. This gun rest advantage will improve the hunter's chances for an accurate shot. Four evenly spaced-apart foot rests, which are not a part of my tree stand invention, attached about the circumference of the tree, assist in a hunter's controlled and silent mobility during its use. The mobile nature of the present invention provides the hunter the option of using a gun support lanyard. Such a lanyard may be secured to the uppermost portion of the stand or to the stand support member. The hunter may grasp the lanyard with his gun support hand in such a way as to allow the lanyard to support the weight of his extended arm and the gun. Such a lanyard will provide sturdy support in situations wherein it is desirable to hold a gun pointed at game while awaiting an open shot. Hunting from a tree stand which can easily be maneuvered into the desired position without the need to stand up is highly desirable and is currently absent from tree stand technology. Due to its design and balance, the likelihood of falling out of the stand disclosed herein is extremely slight and even less likely by use of an ordinary lap belt.

An examination of the prior art in the field of hanging chairs teaches a variety of approaches. U.S. Pat. No. 3,528,657 to Krupsky (1970) exhibits a rigid frame without arm movement impediment, however, the seating arrangement anticipates the users will be children placed in the device by adults. Such seating arrangement is not suited to adult use. Generally, other prior art hanging chairs or swings present support or stabilizing ropes, cables or the like which preclude free and unimpeded arm movement so necessary to the sport of hunting.

It is apparent that patience is necessary to hunting success. The discomfort of buttock fatigue can test one's patience. Prior art tree stands typically provide the user an option of standing to relieve this condition. My mobile stand also allows standing, however one embodiment of the mobile stand disclosed herein provides an optional feature which allows the user to rearwardly recline and shift a portion of his body weight so that it is supported by his back instead of the buttock area. The prior art U.S. Pat. No. 5,316,104 to Amacker (1994) provides an adjustable seat however, positions available to the user are limited to reclining or lounging postures and do not provide the option to fully assume the supine position. Said optional feature of my mobile stand allows the user to sit in the fully upright position, or easily select any of numerous reclining positions between upright and the supine. Said feature further allows the user to return to the upright position without any adjustment of the stand in the event game is sighted. Returning the stand to the upright position is readily accomplished easily and silently.

Tree climbing stands comprise a significant percentage of portable tree stands currently in use. While these stands offer advantages, branches often must be removed in order for the user to reach the desired height in the tree. Users of my mobile stand will often find the presence of branches an asset. Branches may selectively be used as foot rests. It is often convenient to hang the stand itself from a branch. Climbing stands are made for use in trees which fall within a certain size range. Use of such stands upon trees outside that size range is impossible or unsafe. My mobile stand may be used in any tree large and strong enough to support the weight of its user.

Prior art tree stands generally meet one need; that of providing the user with a vantage point substantially above ground level. My mobile stand, within its various embodiments, is readily usable at ground level. Ground level hunting for game animals such as deer, elk and bear is pursued by many. Some remain on the ground by choice, while others do so because of physical or psychological limitations. Numerous patents have been issued for devices which attach to trees at or near ground level. Examples include U.S. Pat. No. 2,851,085 to Woodward (1958), U.S. Pat. No. 3,990,537 to Swenson (1976), and U.S. Pat. No. 5,269,395 to Lyzhoft (1993). These devices and others in the prior art do not provide mobility in that they are rigidly attached to the supporting structure. My mobile stand provides advantages over prior art devices when suspended from a tree at ground level. Major advantages are:

(a) The user may assume and maintain a position so that the tree is between the user and the game thereby enjoying a degree of insurance against detection.

(b) The tree may be used as a gun rest for a shot in any direction.

(c) A gun support lanyard may be used in a manner not available to users of rigidly mounted stands.

In addition to tree stand use, this invention is readily usable by adults and children both indoors and outdoors in recreational pursuits common to hanging chairs. There is no known invention that has all of the features and advantages of the invention disclosed herein.

BRIEF SUMMARY OF INVENTION—OBJECTS AND ADVANTAGES

In view of the shortcomings of prior art devices, as well as disadvantages not specifically mentioned above, it should be apparent that there exists a need in the art for a mobile tree stand which is comfortable, safe and simple to use. It is therefore a primary object of this invention to fulfill this need by providing a mobile stand which is attachable to a tree by use of a single suspending member such as a rope, chain or the like. Several other objects and advantages are:
  (a) to provide a mobile stand which allows the user to use the tree in which the stand is mounted as an article of concealment against detection by game;
  (b) to provide a mobile stand which allows the user to shoot in any direction without the need to stand or otherwise place himself in danger of falling;
  (c) to provide a mobile stand which allows the user to employ the tree in which the stand is mounted as a gun rest for a shot in any direction;
  (d) to provide a mobile stand which allows the user to maintain a lookout in every direction with a minimum of movement;
  (e) to provide a mobile stand which in its various embodiments is readily disassembled for easier transport and storage;
  (f) to provide a mobile stand which in one embodiment provides an optional feature that allows the user to select any of numerous reclining postures and includes the option to lie in a completely supine position;
  (g) to provide a mobile stand which is safe to use and provides the user with the perception that he is safe;
  (h) to provide a mobile stand which is usable at ground level as well as at any chosen elevation above the ground;
  (i) to provide a mobile stand which is readily usable at home or elsewhere, indoors or outdoors in recreational pursuits common to hanging chairs and swings;

Still further objects and advantages will become apparent from a consideration of the ensuing description and drawings.

The description herein provides preferred embodiments and should not be construed as limiting the scope of my tree stand invention. For example, variations in the configuration of the arm rest members; the number of parts into which it can be dismantled; the size and configuration of the back support member; the materials from which the upper and lower tubular support members are made; the type of materials used for the seat and back support members; other than those shown and described herein may be incorporated into the present invention. Thus the scope of the present invention should be determined by the appended claims and their legal equivalents, rather than being limited to the examples given.

DETAILED DESCRIPTION OF THE INVENTION

Figure 1:
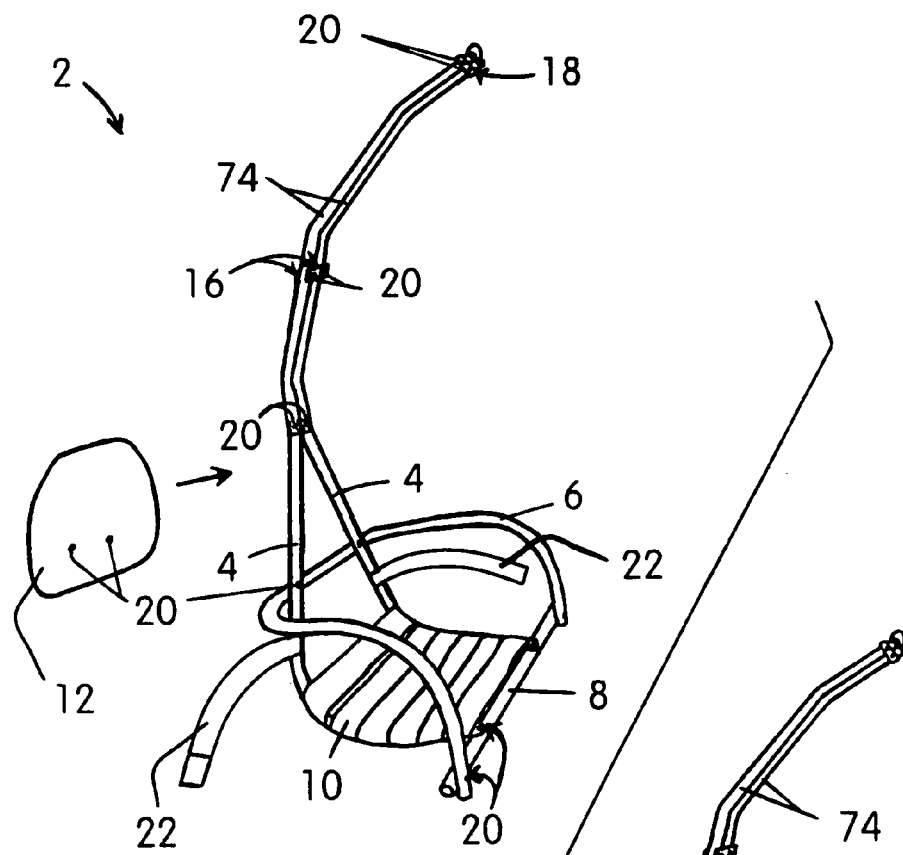
FIG. 1 is a perspective view of a first preferred embodiment of my mobile tree stand invention having two upper support member tubes positioned substantially parallel to one another and connected centrally with opposing brackets, a mounting bracket attached to the top ends of the tubes in the upper support member and configured for connection of a rope, chain or the like, two lower support members each having tubing with a crimped upper end configured for mating with the bottom ends of the upper support member tubes and spaced-apart lower ends with flexible torso supporting seat material positioned therebetween, an optional seat belt attached to the lower support members, a substantially U-shaped arm rest, a lower front rail attached to the front ends of both the arm rest and the lower support members, and a back support that is removed from the lower support member to reveal the connection between the bottom ends of the tubes in the upper support members and the crimped upper ends of the lower support members.
Figure 2:
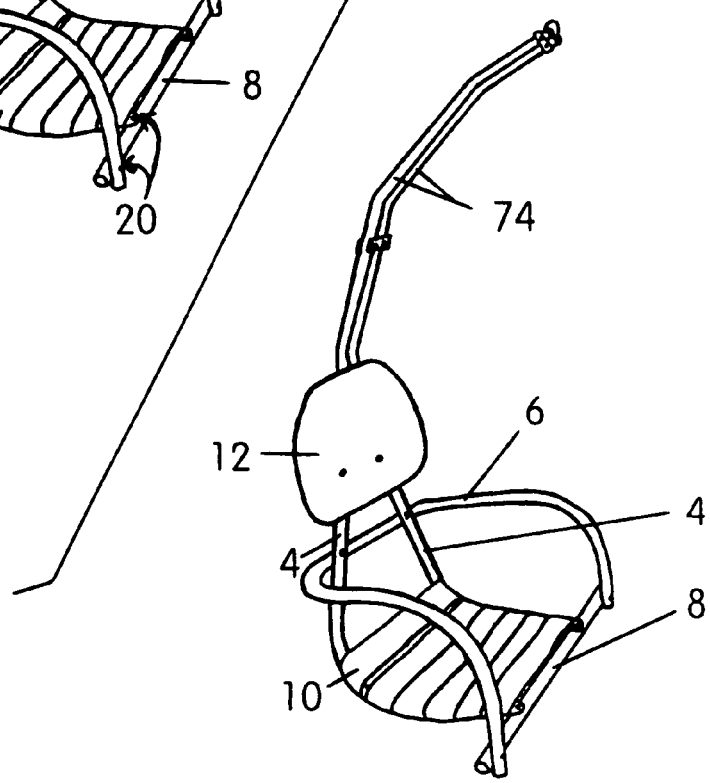
FIG. 2 is a perspective view of the first preferred embodiment showing the back support in its usable position.

FIGS. 1 and 2 show a first preferred embodiment 2 of my mobile tree stand invention, with FIG. 2 showing a back support 12 in its usable position and FIG. 1 showing back support 12 removed to reveal the connection between upper support members 74 and lower support members 4 that allows first preferred embodiment 2 to be readily disassembled for easy transport and storage. Upper support members 74 are each made from tubing that is aligned in a substantially parallel configuration with the other and connected to one another in two places. The uppermost ends are attached to one another by a mounting bracket 18 that is adapted for connection to a rope, chain, or the like (not shown). Each upper support members 74 is also centrally connected to the other by a two-sided cleat 16. Further, the uppermost ends of upper support members 74 angle forwardly to assist in balance of first preferred embodiment 2 when it is occupied. Two-sided cleat 16 and mounting bracket 18, each secured to upper support members 74 by fasteners 20, both add stability to the non-linear configuration of upper support members 74. Although not limited thereto, and not shown in detail in FIG. 1 or FIG. 2, fasteners 20 preferably consist of a bolt or pin. The number and type of fasteners 20 used is not critical, as long as collectively they are sufficiently strong to fulfill their function of maintaining the attachment of two-sided cleat 16 and mounting bracket 18 to upper support members 74 while supporting a user's weight. It is also contemplated for fasteners 20 to be used to secure upper support members 74 and lower support members 4 in their joined condition, and for attachment of back support 12 to lower support members 4. The configuration of back support 12 and fasteners 20 may require that back support 12 be removed from lower support members 4, prior to the disconnection of upper support members 74 from lower support members 4. Although rigid materials or a combination of rigid and resilient materials are preferred for back support 12, the materials used for back support 12 are not critical, as long as back support 12 is able to adequately fulfill its intended support function. FIGS. 1 and 2 further show lower support members 4 each made from tubing with a crimped upper end that is configured for mating with the tubular bottom ends of upper support members 74. Once fasteners 20 are removed, it is contemplated for the crimped ends of lower support members 4 to be readily removed from the tubular bottom ends of upper support members 74. Although in FIGS. 1 and 2 lower support members 4 each have a crimped upper end and the lower ends of upper support members 74 remain tubular in configuration, the reverse is also contemplated to be within the scope of the present invention. In addition, FIGS. 1 and 2 show lower support members 4 having spaced-apart lower ends and flexible torso supporting seat material 10 positioned therebetween. Torso supporting seat material 10 should be sufficiently resilient to minimize buttock fatigue of a user, such as a hunter or photographer who may be required to wait for an extended period of time to gain a desired shot. The central portion of a substantially U-shaped arm rest 6 is secured with fasteners 20 to the upper portion of lower support members 4, below back support 12 and behind the back surface of lower support members 4. Connection of arm rest 6 in front of lower support members 4 would cause a protrusion that would be uncomfortable for an occupant. The opposing ends of arm rest 6 are each downwardly extending and secured with fasteners 20 to opposing lateral portions of a lower front rail 8. In contrast, the front ends of the lower support members 4 are connected to lower front rail 8 centrally between the opposing ends of arm rest 6 and at a spaced-apart distance therefrom. It is contemplated for arm rest 6 and lower front rail 8 to be made from tubular or rod-like material. However, for weight or expense considerations, tubing may be preferred. FIGS. 1 and 2 further show first preferred embodiment 2 having a removable back support 12, with back support 12 removed from lower support member 4 in FIG. 1 to reveal the positioning of the connection between the bottom ends of the tubular upper support members 74 and the crimped upper ends of lower support members 4. For easier transport, and/or storage between intermittent use, it is contemplated that first preferred embodiment 2 would be dismantled into at least two sections, one comprising upper support members 74, cleat 16, and mounting bracket 18, with the other section comprising lower support members 4, arm rest 6, torso supporting material 10, lower front rail 8, and back support 12, unless it is required that back support 12 be removed prior to separation of upper support members 74 from lower support members 4, wherein three sections would result. In addition, FIG. 1 shows an optional seat belt 22 connected to the rear portion of lower support members 4, rearward of flexible torso supporting seat material 10. The materials from which upper support members 74, lower support members 4, arm rests 6, lower front rail 8, torso supporting seat material 10, fasteners 20, cleat 16, and mounting bracket 18 are made should be light in weight and resist deterioration by weathering elements.

Figures 3, 4:
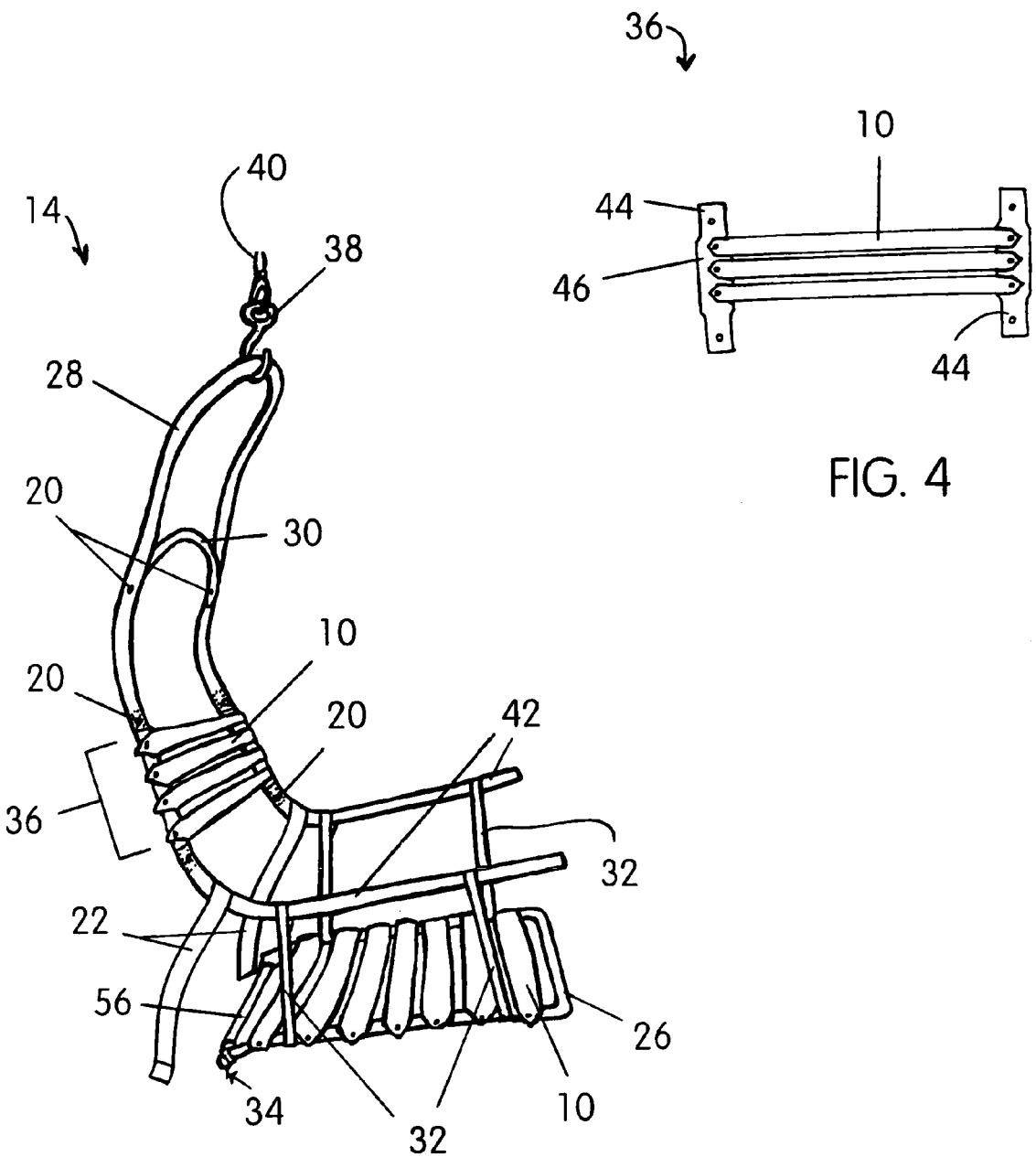
FIG. 3 is a side view of a second preferred embodiment of my mobile tree stand invention suspended from a hook and having an inverted U-shaped tubular upper support member with a centrally positioned reinforcing brace that strengthens the upper support member and maintains the bottom ends of the upper support member at a substantially uniform spaced-apart distance from one another, two lower support members with opposing ends and each functioning as an arm rest, a back support member with crimped upper ends configured for mating with the tubular bottom ends of the upper support member and crimped lower ends configured for mating with the rearwardly positioned tubular ends of the two lower support members, an optional seat belt connected to the rearward portion of the lower support members, and a seat member made from horizontally extending flexible torso supporting material that is removably suspended by straps from the arm rest portion of the lower support members.
FIG. 4 is an enlarged front view of the back support member of the second preferred embodiment having upper and lower crimped ends.

FIGS. 3 and 4 show a second preferred embodiment 14 of my mobile tree stand invention with FIG. 3 showing second preferred embodiment 14 suspended from a hook 38 that is supported by a rope, chain or cable 40 and FIG. 4 showing an enlarged view of the configuration of back support member 36 with its crimped lower and upper ends 44. Although not shown, the means of overhead suspension provided as a part of second preferred embodiment 14 need not be limited to rope, chain or cable 40. FIG. 4 shows back support member 36 having four bands or strips of flexible torso supporting material 10, while FIG. 3 shows back support member 36 having only three such bands or strips. Thus, the amount or configuration of flexible torso supporting material 10 used as a part of back support member 36 is not critical, as long as it comfortably supports the back of its user. FIG. 3 further shows second preferred embodiment 14 having an inverted U-shaped tubular upper support 28 that is in direct contact with and supported by hook 38. FIG. 3 also shows a reinforcing brace 30 secured by fasteners 20 to upper support 28 at a spaced-apart distance from its inverted U-shaped upper end. The number of fasteners 20 used is not critical, as long as reinforcing brace 30 is securely connected to upper support 28 during use. However, it is contemplated that the number of fasteners 20 used would preferably be kept to a minimum for cost efficiency. Reinforcing brace 30 also has an inverted U-shaped configuration and, although not strictly limited thereto, is shown in FIG. 3 as being secured to upper support 28 in a central position longitudinally between the opposing ends of upper support 28.

Reinforcing brace 30 helps to add strength to the configuration of upper support 28, and maintains the bottom ends of upper support 28 at a substantially uniform spaced-apart distance from one another. FIG. 3 shows the crimped upper ends of back support member 36 connected to the tubular lower ends of upper support 28, as well as the crimped lower ends of back support member 36 connected to the tubular rearward ends of lower support members 42. The crimped upper and lower ends of back support member 36 are identified by the number 44 in FIG. 4. In both FIG. 3 and FIG. 4, back support member 36 is comprised of two spaced-apart vertically extending supports 46, with flexible torso supporting material 10 connected therebetween. It is contemplated in second preferred embodiment 14 for connections between the crimped upper ends 44 of back support member 36 and the tubular lower ends of upper support 28, as well as the connections between the crimped lower ends 44 of back support member 36 and the rear portions of the two lower support members 42 to be assisted by the use of at least one fastener 20. In the alternative and although not shown, it is also contemplated for second preferred embodiment 14 to have the two lower support members 42 each with a crimped upper end configured for mating with tubular bottom ends of back support member 36, and the bottom ends of upper support 28 each having a crimped configuration for mating with tubular top ends of back support member 36. However, for ease in manufacture, it is preferred for back support member 36 to contain crimped ends 44. Further, although less compact for transport and storage, it is also considered to be within the scope of my invention for second preferred embodiment 14 to comprise upper support 28, back support member 36, and two lower support members 42 that are connected in unbroken sequence. Connected to lower support members 42 and suspended downwardly therefrom by four straps 32, FIG. 3 shows a seat member having a frame 26 and flexible torso supporting material 10 extending across frame 26. Although more clearly understood from reviewing the enlarged detail of FIG. 8, frame 26 is U-shaped with its rearward portions connected to a back rail 56. A quick-release pin 34 is shown on both sides of the rear portion of frame 26, for use in connecting back rail 56 to frame 26 and optionally connecting a reclining back member 54 to back rail 56. The upper ends of each strap 32 has a looped configuration of sufficient dimension for insertion therethrough of one lower support member 42. It is not contemplated for straps 32 to be secured to lower support members 42 with fasteners 20, so that during disassembly of second preferred embodiment 14 for transport or storage, the connection between straps 32 and lower support members 42 will allow quick separation of frame 26 and its associated torso supporting material 10 from lower support members 42. Although not shown, the connection between the lower ends of straps 32 and frame 26 is contemplated to be permanent, and can be made by fasteners 20 or any other commonly used means of permanently affixing a strap 32 to a tubular frame 26. Straps 32 may be made from woven or non-woven materials, at the option of the manufacturer. However, resistance to deterioration by weathering elements and lightweight construction are important considerations in selecting the materials used for straps 32. FIG. 3 further shows a seat belt 22 attached to the rear portions of lower support members 42, rearwardly from straps 32. Seat belt 22 is optional, and not required for safe use of second preferred embodiment 14 since the balanced positioning of frame 26 when occupied by a user causes the user's weight to be shifted rearwardly against back support member 36. Even during movement of the user to position second preferred embodiment 14 in any orientation about the circumference of a tree, the user's weight remains shifted rearwardly protecting the user from any risk of falling forwardly off of frame 26 and torso supporting material 10, and giving most users a perception of being safe. However, should a user feel more comfortable with a means for securing him or her to second preferred embodiment 14, seat belt 22 can be optionally made available. For easier transport and/or storage between intermittent use, and where a separable back support member 36 is used, it is contemplated that second preferred embodiment 14 would be dismantled into five sections, the first section comprising upper support member 28 and reinforcing brace 30, the second section comprising back support member 36, the third section comprising one lower support member 42, the fourth section comprising the other lower support member 42, and with the fifth section comprising frame 26, torso supporting material 10, straps 32, and back rail 56, unless upper support member 28, back support member 36, and lower support members 42 are connected in unbroken sequence wherein two sections would result, or where back support member 36 is connected in unbroken sequence to upper support member 28 four sections would result, or where back support member 36 is connected in unbroken sequence to lower support members 42, three sections would result.

Figure 5:
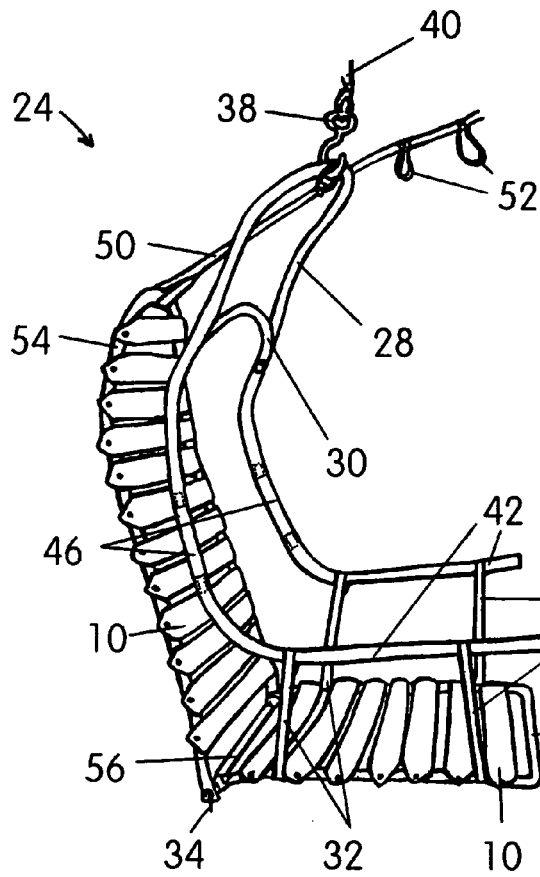
FIG. 5 is a side view of a third preferred embodiment of my mobile tree stand invention suspended from a hook and having an inverted U-shaped tubular upper support member with a centrally positioned reinforcing brace that maintains the bottom ends of the upper support member at a substantially uniform spaced-apart distance from one another, two tubular lower support members each functioning as an arm rest, two tubular central support members each having crimped upper and lower ends respectively configured for mating with the tubular bottom ends of the upper support member and the tubular rearward ends of the two lower support members, a flexible seat member removably suspended by straps from the arm rest portion of the lower support members, a back support member pivotally connected to the rear portion of the seat member, and a means of incrementally lowering the back support member between a substantially upright position and a horizontally extending rearwardly reclined position.
Figure 6:
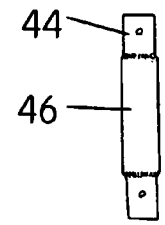
FIG. 6 is a front view of one of the central support members used in the third preferred embodiment.
Figure 7:
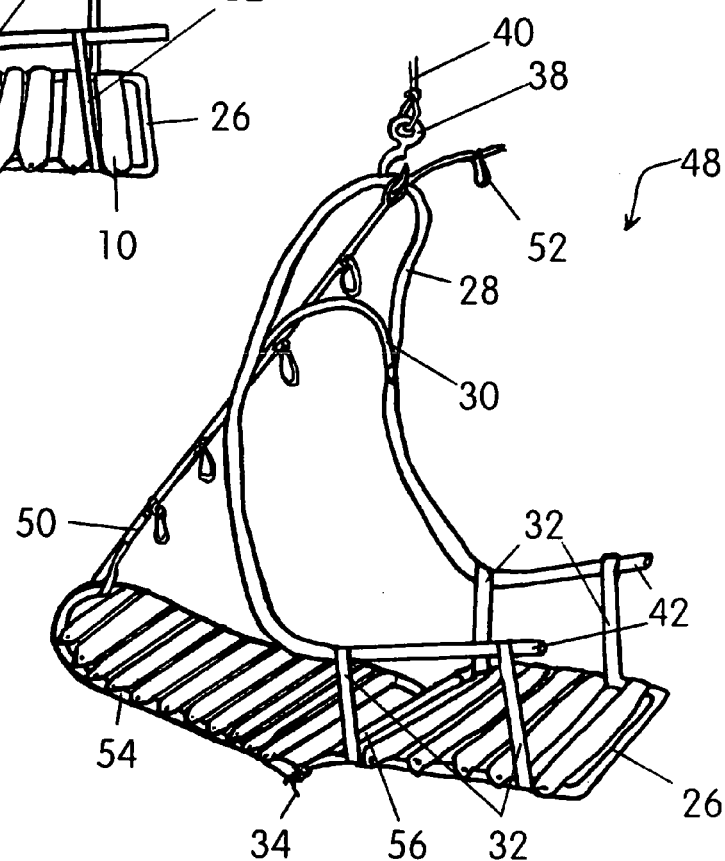
FIG. 7 is a side perspective view of a fourth preferred embodiment similar to the third preferred embodiment, but without central support members, and having its back support lowered into a horizontally extending position that is nearly fully reclined.
Figure 8:
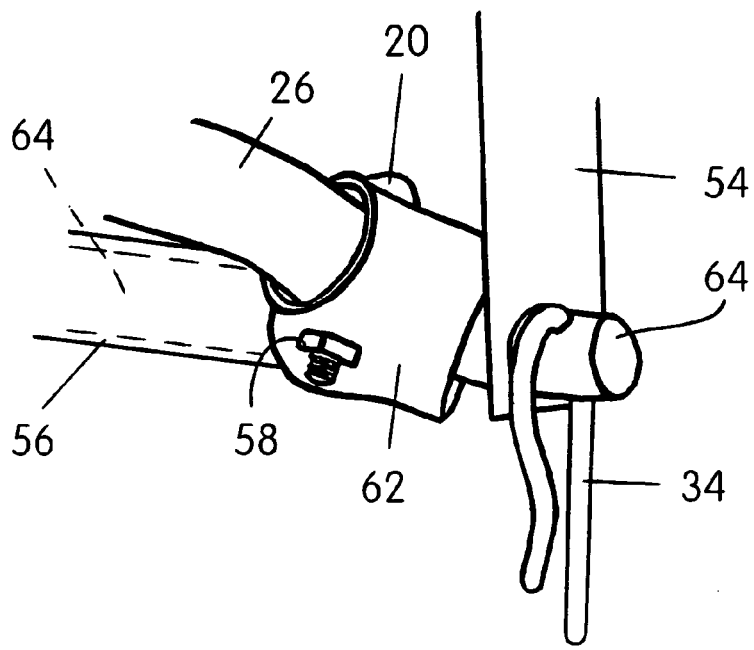
FIG. 8 is a perspective view of the pivotal connection between the rear portion of the seat member and the lower end of the back support in the third and fourth preferred embodiments.

FIGS. 5, 6, and 8 show a third preferred embodiment 24 of my mobile tree stand invention that allows a user (not shown) to select any of numerous reclining postures to obtain better positioning to take a shot and/or relieve buttock fatigue, and includes an option for the user to lie in a completely supine position. FIG. 7 shows a fourth preferred embodiment 48 similar to third preferred embodiment 24, which instead has no central supports 46, as well as an upper support member 28 and lower support members 42 that are connected in unbroken sequence. Where compact transport and/or storage are prime considerations, third preferred embodiment 24 would be selected for use instead of fourth preferred embodiment 48. Although not shown, it is also considered to be within the scope of the present invention to have an additional embodiment without central support members 46, wherein upper support member 28 is directly connected to lower support members 42 through crimped connection secured by at least one fastener 20, but which remains readily removable from lower support members 42 so as to allow more compact transport and storage than would be possible using fourth preferred embodiment 48, even though such a configuration is not as compact as that achievable via third preferred embodiment 24. FIGS. 5 and 7 respectively show third preferred embodiment 24 and fourth preferred embodiment 48 suspended from a hook 38, while FIG. 6 shows an enlarged view of one of the central support members 46 usable with third preferred embodiment 24. FIG. 8 shows a detailed view of the pivotal connection between the rear portion of frame 26 and the lower end of reclining back support 54. In FIG. 5, back support 54 is in a substantially upright position and in FIG. 7 back support 54 is lowered by support means 50 into a horizontally extending and nearly fully reclined position. Third preferred embodiment 24 and fourth preferred embodiment 48 can optionally be made from second preferred embodiment 14 by replacing back member 36 with two vertically extending central supports 46 having no torso supporting material 10 extended therebetween, and further pivotally connecting a reclining back member 54 to frame 26 and back rail 56. Straps 32 in fourth preferred embodiment 48 would still preferably connect frame 26 to lower support members 42, and upper support member 28 would still preferably have an inverted U-shaped tubular configuration with a reinforcing brace 30. FIGS. 5 and 7 further show a preferred means of incrementally lowering back support 54 between a substantially upright position and a horizontally extending rearwardly reclined position. Although not limited thereto, the preferred means for changing the position of back support 54 includes a flexible line 50 having spaced-apart loops 52 along its length that are appropriate in size for insertion of hook 38. Thus, hook 38 and loops 52 can be employed by a user waiting for game to periodically adjust back support 54 into any of several rearwardly reclined positions according to user comfort, including a substantially horizontally extending position, and even the user in a supine position is able to promptly and silently return to the upright position in the event game is sighted, without any stand adjustment of any kind. Back support 54 would remain in its lowered position until such time as the user employs hook 38 and a different loop 52 to make an adjustment in the angular orientation of back support 54 relative to frame 26. Although not shown and not limited thereto, a means of attaching the surplus distal length of line 50 in an out-of-the-way position to upper support 28 can comprise one or more lengths of plastic tubing secured to one side of upper support 28. Although FIGS. 5 and 7 do not show a seat belt 22 attached to the rearward portion of lower support members 42, and safe use of my mobile tree stand invention is not dependent upon use of a seat belt 22, one can be optionally employed with third preferred embodiment 24 or fourth preferred embodiment 48 where so desired by a user. FIG. 8 shows an enlarged view of one of the preferred means of connection between back rail 56, frame 26, and back support 54, which allows quick release of back support 54 from frame 26. FIG. 8 shows back rail 56 attached to a connector 62, with frame 26 also being attached to the same connector 62 in a substantially perpendicular orientation from back rail 56. Although FIG. 8 shows a fastener 20 in the form of a bolt and a nut 58 connected to the threaded end of fastener 20, being used to attach frame 26 to connector 62, it is contemplated for any fastening means to be used to attach frame 26 and back rail 56 to connector 62 that firmly maintains attachment of frame 26 and back rail 56 to connector 62 when frame 26 is subjected to a user's full body weight. FIG. 8 further shows a rod 64 inserted through the hollow interior of back rail 56, connector 62, an aperture through the lower end of back support 54, and being held in place through use of a quick-release pin 34. Since FIG. 8 only shows one end of back rail 56, it is contemplated that a second connector 62 and quick-release pin be used at the other end of back rail 56 to secure it to frame 26 and back support 54. Further, the use of a quick-release pin 34 having the configuration shown in FIG. 8 is not critical, and it is considered to be within the scope of the present invention to have any quick-release means that secures rod 64 to back support 54 while allowing expedient connection and removal of back support 54 from frame 26. As an alternative, in place of one quick-release pin 34, although not shown, it is contemplated for back rail 56 to be flared or otherwise expanded at one end, or for one or both quick-release pins 34 to be replaced by a promptly removable tight-fitting or threaded cap. For easier transport and/or storage between intermittent use, and where removable central supports 46 are used, it is contemplated that third preferred embodiment 24 would be dismantled into seven sections, the first section comprising upper support member 28 and reinforcing brace 30, the second section comprising the first central support 46, the third section comprising the second central support 46, the fourth section comprising one lower support member 42, the fifth section comprising the other lower support member 42, the sixth section comprising frame 26, torso supporting material 10, straps 32, and back rail 56, and the seventh section comprising reclining back support 54 and line 50, unless upper support member 28, central supports 46, and lower support members 42 are connected in unbroken sequence as in fourth preferred embodiment 48, wherein three sections would result, or when central supports 46 are connected in unbroken sequence to either upper support member 28 or lower support members 42, five sections would result.

Figure 9:
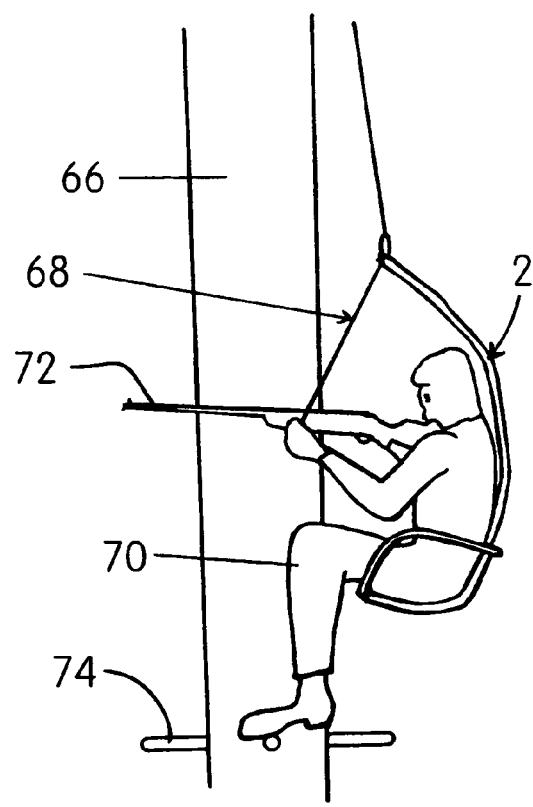
FIG. 9 is a perspective view of the first preferred embodiment of my mobile tree stand invention suspended from a tree and a hunter in the tree stand using a gun support lanyard, with the gun support lanyard being connected to the uppermost end of the upper support member of the tree stand, with the hunter also using foot supports that are not a part of my invention to assist in silent and controlled mobility while in the tree.

FIG. 9 shows first preferred embodiment 2 suspended from a tree 66 and a hunter 70 sitting in first preferred embodiment 2 in a position that faces tree 66. A gun support lanyard 68 is suspended from the uppermost end of the upper support member of first preferred embodiment 2. The hunter 70 may grasp lanyard 68 with his gun support hand in such a way as to allow lanyard 68 to support the weight of his extended arm and gun 72. Such a lanyard 68 will provide sturdy support in situations wherein it is desirable to hold gun 72 pointed at game while awaiting an open shot. FIG. 9 also shows hunter 70 using foot supports 74 that are not a part of my invention to assist in silent and controlled mobility of hunter 70 and first preferred embodiment while in tree 66. Although not limited thereto, it is preferred that four foot rests 74 be used, which are evenly spaced-apart from one another about the circumference of tree 66. Further, although not shown and not required, in addition to or in place of foot rests 74, a rigidly mounted platform of the type commonly employed in tree stand technology, may be used as an option with any embodiment of my tree stand invention, including first preferred embodiment 2.

All of the preferred embodiments of my mobile stand are comfortable, safe and simple to use and may be employed in any tree 66 large and strong enough to support the weight of hunter 70. They attach to tree 66, or a large branch thereof, by use of a single overhead suspending member such as a rope, chain, cable, or the like, and in addition to providing safe positioning for hunter 70, they provide hunter 70 with the perception that he is safe. The preferred embodiments of my mobile stand provide hunter 70 with the ability to safely, quietly and easily maneuver into any position about the entire circumference of tree 66 to maintain a lookout in every direction. Also, hunter 70 can easily achieve a quick 90° or 180° shift in position with my tree stand without needing to stand up, and do so silently. Foot supports 74, platforms, tree branches, or a combination thereof, can further assist the controlled mobility of hunter 70. When foot rests 74 alone are used, they would be secured within bores in tree 66 and evenly spaced-apart about its circumference. Hunter 70 may also assume and maintain a position so that tree 66 is between him and the game, thereby enjoying a degree of insurance against detection. The preferred embodiments of my mobile stand further allow hunter 70 to use tree 66 as a rest for gun 72. The gun rest advantage improves the chances for hunter 70 to obtain an accurate shot. Optionally, the preferred embodiments of my mobile stand are also readily usable at ground level. Ground level hunting for game animals, including deer, elk and bear, is pursued by many. Some hunters 70 remain on the ground by choice, while others do so because of physical or psychological limitations. Further, in addition to tree stand use, my invention is readily usable by adults and children both indoors and outdoors in recreational pursuits common to hanging chairs and swings, and is particularly useful where unrestricted arm movement would provide an advantage. For convenience, the most preferred embodiments of my stand are also readily disassembled for easy transport and storage. Variations can occur in, but are not limited to, the materials from which the components are made; the degree of resistance of the components to deterioration from weathering elements; the overall weight of the stand; the configuration of the components used as arm rests for hunter 70; the number of parts into which the stand can be dismantled for transport or storage; and the size and configuration of the back support used.

What is claimed is:

1. A manually-operated mobile stand for moving freely with an occupant and being suspended from a single overhead location, and when that location places the occupant in close proximity to a tree, the occupant is able to face the tree and be provided with controlled mobility for easy and silent maneuvering of said stand into any position about the circumference of the tree while the occupant remains seated, and whereby the occupant can promptly achieve a quick 180° shift in position while remaining seated to achieve a comfortable and confident shot in any direction relative to the tree, said mobile stand comprising:
   a plurality of parallel upper tubular members joined together, with each having a forwardly angled uppermost end and a lower end;
   attachment means connected to said uppermost ends and adapted for connecting said uppermost ends to rope, cable, and chain;
   a plurality of lower tubular members each having a first end and a second end, with said first ends being connected to said lower ends of said upper tubular members, upper portions of said lower tubular members diverging downwardly and away from each other, and lower portions of said lower tubular members extending in a forwardly direction and forming spaced apart seat supports;
   a front rail positioned in front of said seat supports, with said second ends of said lower tubular members being connected to said front rail;
   a U-shaped arm rest with a web portion thereof centrally connected to said downwardly diverging lower tubular members and leg portions of said U-shaped arm rest extending above and substantially parallel to said seat supports, said leg portions having downwardly extending ends connected to said front rail; and
   a seat comprising a flexible material attached between and to said seat supports so that when said attachment means is connected to a single overhead location in proximity to a tree and an occupant is positioned on said seat, while facing the tree the seated occupant is able to employ hands, arms, legs, and feet in varying combination to promptly, silently, and in a controlled manner change position of said mobile stand relative to the tree.

2. The mobile stand of claim 1 further comprising reinforcement means connecting said joined parallel upper tubular members together.

3. The mobile stand of claim 2 wherein said reinforcement means comprises at least one two-sided cleat.

4. The mobile stand of claim 1 wherein said lower tubular members and said joined parallel upper tubular members are secured together during use by crimped connection and a plurality of fasteners.

5. The mobile stand of claim 1 further comprising seat belt means.

6. The mobile stand of claim 5 wherein said seat belt means is connected to said downwardly diverging upper portions of said lower tubular members.

7. The mobile stand of claim 1 further comprising back support means connected to said downwardly diverging upper portions of said lower tubular members, and wherein said back support means is selected from a group consisting of detachable back supports and permanently connected back supports.

8. The mobile stand of claim 1 further comprising a flexible gun support lanyard with a proximal end, and said proximal end adapted for connection to said attachment means or an overhead support.

9. The mobile stand of claim 1 wherein said attachment means connected to said uppermost end comprises a mounting bracket.

* * * * *